(12) United States Patent
Wang

(10) Patent No.: US 7,879,226 B2
(45) Date of Patent: Feb. 1, 2011

(54) FLOW INDICATOR FOR SHOWING BLOCKING OF FILTER COTTON

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 450 days.

(21) Appl. No.: 12/032,867

(22) Filed: Feb. 18, 2008

(65) Prior Publication Data
US 2009/0206015 A1     Aug. 20, 2009

(51) Int. Cl.
*B01D 35/143* (2006.01)
(52) U.S. Cl. .......................... 210/87; 340/607; 340/610
(58) Field of Classification Search .................. 210/87, 210/90; 340/607, 608, 610
See application file for complete search history.

(56) References Cited

U.S. PATENT DOCUMENTS 859,147 A * 7/1907 Strodtbeck ............. 200/81.9 R
4,136,330 A * 1/1979 Estaque ...................... 340/459

* cited by examiner

*Primary Examiner*—Terry K Cecil
(74) *Attorney, Agent, or Firm*—Guice Patents PLLC

(57) ABSTRACT

A flow indicator for showing blocking of filter cotton, being installed in a pipe line of a spraying head for the purpose of showing and controlling blocking of filter cotton in a filter in connecting with a submerged pump for the spraying head, it has a tri-branch tube to connect the pipe line, and to connect to a housing provided therein with an electric power source, an indicating device, an igniting switch and a triggering device, the tri-branch tube is provided therein with a pusher rod that can detect the pressure of water and can thus be moved. When the filter cotton is blocked to lower the water pressure, the pusher rod is moved and makes the triggering device to turn on the indicating lamp device, in order to warn a user to clean or change the filter cotton of the filter.

7 Claims, 8 Drawing Sheets

FLOW INDICATOR FOR SHOWING BLOCKING OF FILTER COTTON

BACKGROUND OF THE INVENTION

1. Field of the Invention

The present invention relates to an indicator, and especially to a flow indicator used in a pumping pipe line for a submerged pump having a filtering-cotton filter, which is a flow indicator for showing blocking of filter cotton.

2. Description of the Prior Art

A simple water spraying system used in a pond mainly has a spraying head of which a pipe line is connected to a submerged pump for water spraying of the spraying head. But for keeping long life of use of the submerged pump, the submerged pump must be connected to a filter to filter out the impurities in the water.

In a filter of the kind often seen, filter cotton is given to provide a function of filtering, while after using for a long time, the filter cotton will be blocked, hence water pressure in pumping of the submerged pump will be lowered, but a user is unable to be aware of this and is unable to change the filter cotton or clean the filter in time, this is a problem resided in the conventional filters, and improvement is wanted.

SUMMARY OF THE INVENTION

The present invention mainly is to provide a flow indicator for showing blocking of filter cotton, the indicator mainly is installed in a pipe line of a spraying head for the purpose of showing and controlling blocking of filter cotton in a filter in connecting with a submerged pump for the spraying head. The present invention mainly has a tri-branch tube to connect the pipe line, and to connect to a housing provided therein with an electric power source, an indicating device, an igniting switch and a triggering device, the tri-branch tube is provided therein with a pusher rod that can detect the pressure of water and can thus be moved. When the filter cotton is blocked to lower the water pressure, the pusher rod is moved and makes the triggering device to turn on the indicating lamp device, in order to warning a user to clean or change the filter cotton of the filter.

The indicating lamp device of the flow indicator for showing blocking of filter cotton of the present invention has an LED lamp sealed with a lamp shade, when the LED lamp is damaged, the lamp shade can be opened for changing.

The electric power source of the present invention mainly is supplied with electric power from a battery, when the electric power is exhausted, a lid on the housing can be opened for changing.

And the flow indicator for showing blocking of filter cotton provided by the present invention can be removed from the pipe line to be installed on another submerged pump.

The present invention will be apparent in its structure and effect of using after reading the detailed description of the preferred embodiment thereof in reference to the accompanying drawings.

DETAILED DESCRIPTION OF THE PREFERRED EMBODIMENT

Figure 1:
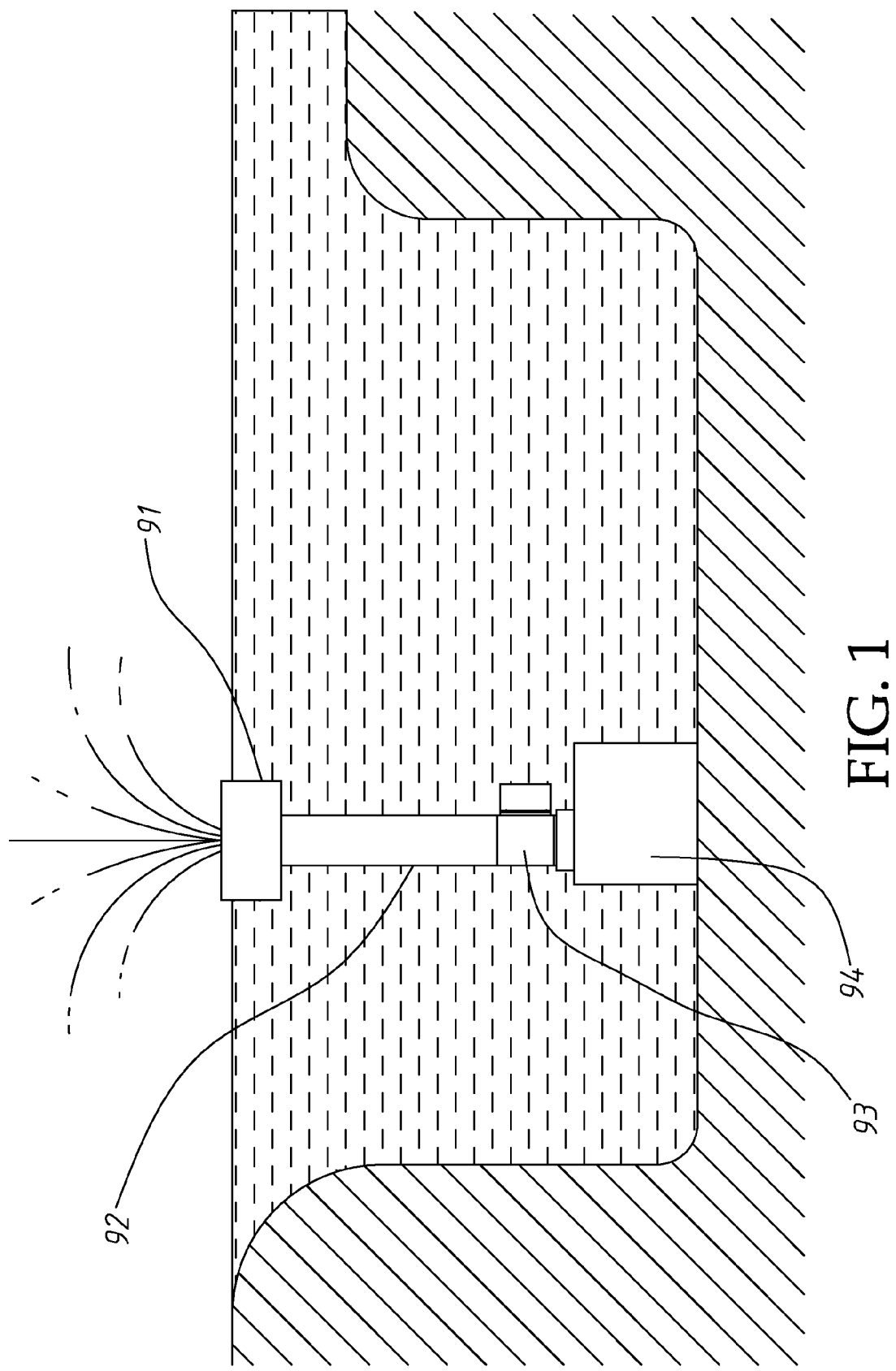
FIG. 1 is a schematic view showing a water spraying system in a pond.

A flow indicator 93 capable of showing blocking of filter cotton of the present invention is installed in a pipe line 92 of a spraying head 91 as shown in FIG. 1 for the purpose of showing and controlling blocking of the filter cotton in a filter (not shown) in connecting with a submerged pump 94 of the spraying head 91.

Figure 2:
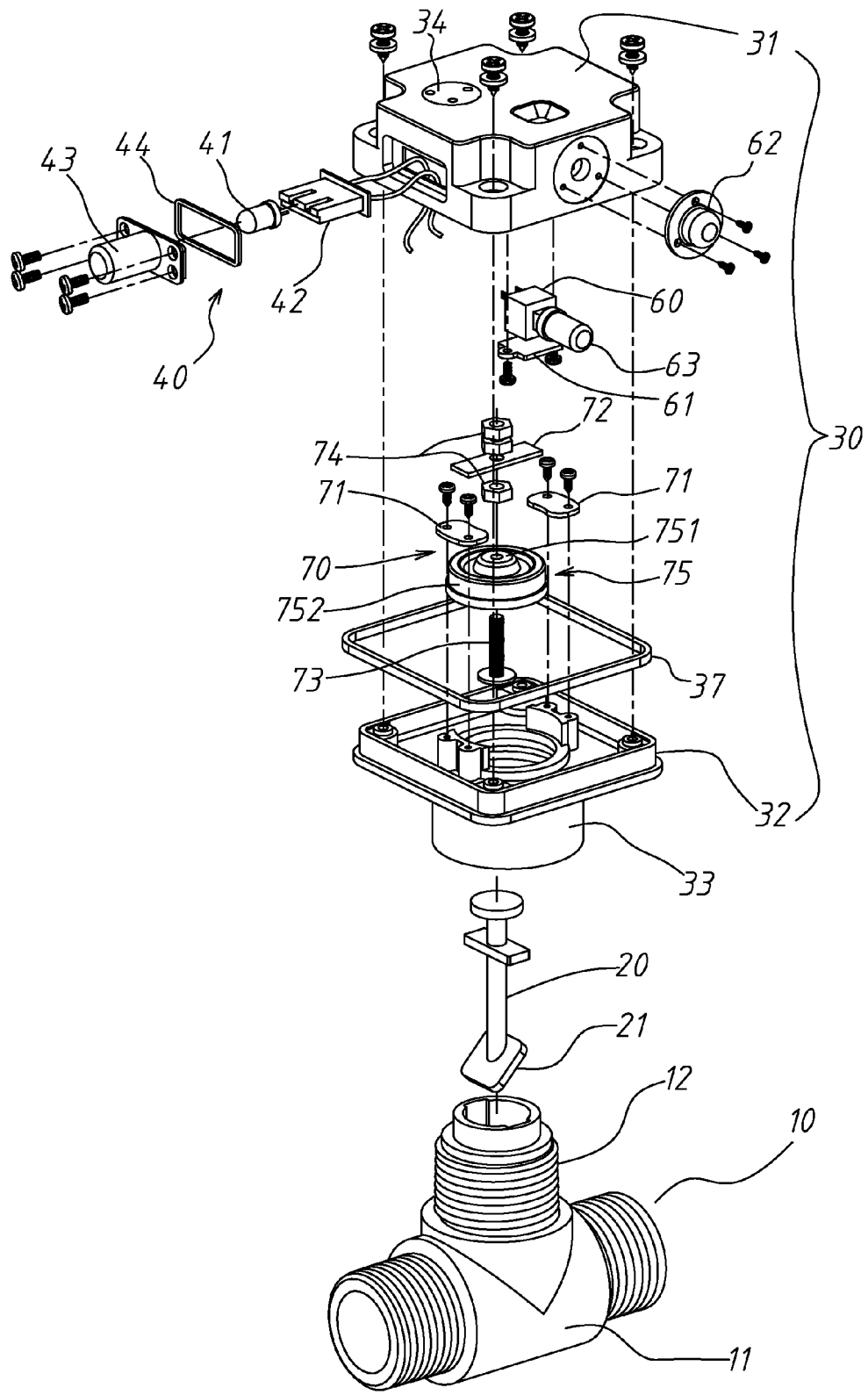
FIG. 2 is an anatomic perspective schematic view of the present invention.
Figure 3:
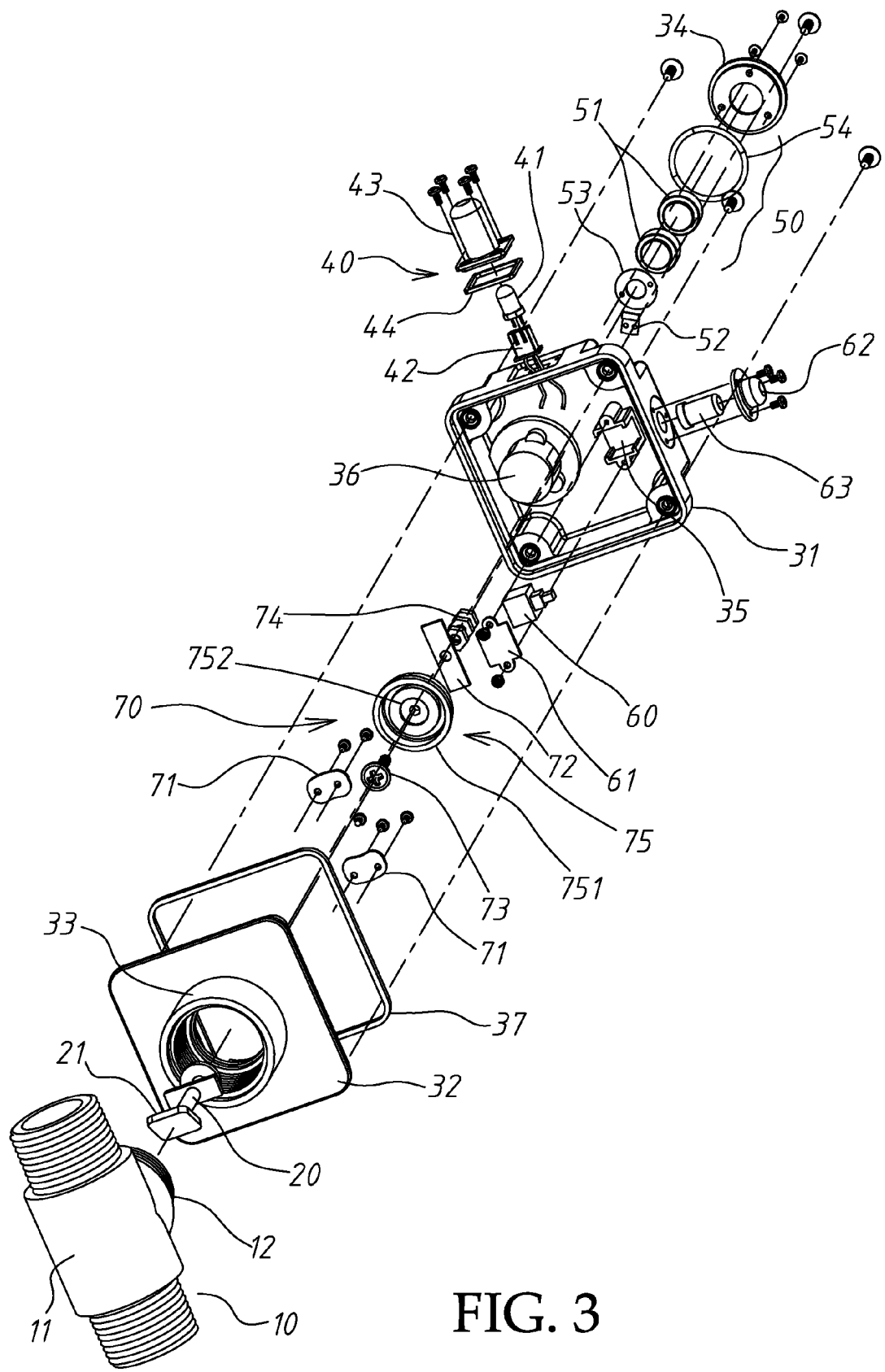
FIG. 3 is an anatomic perspective schematic view of the present invention in another viewing angular position.
Figure 4:
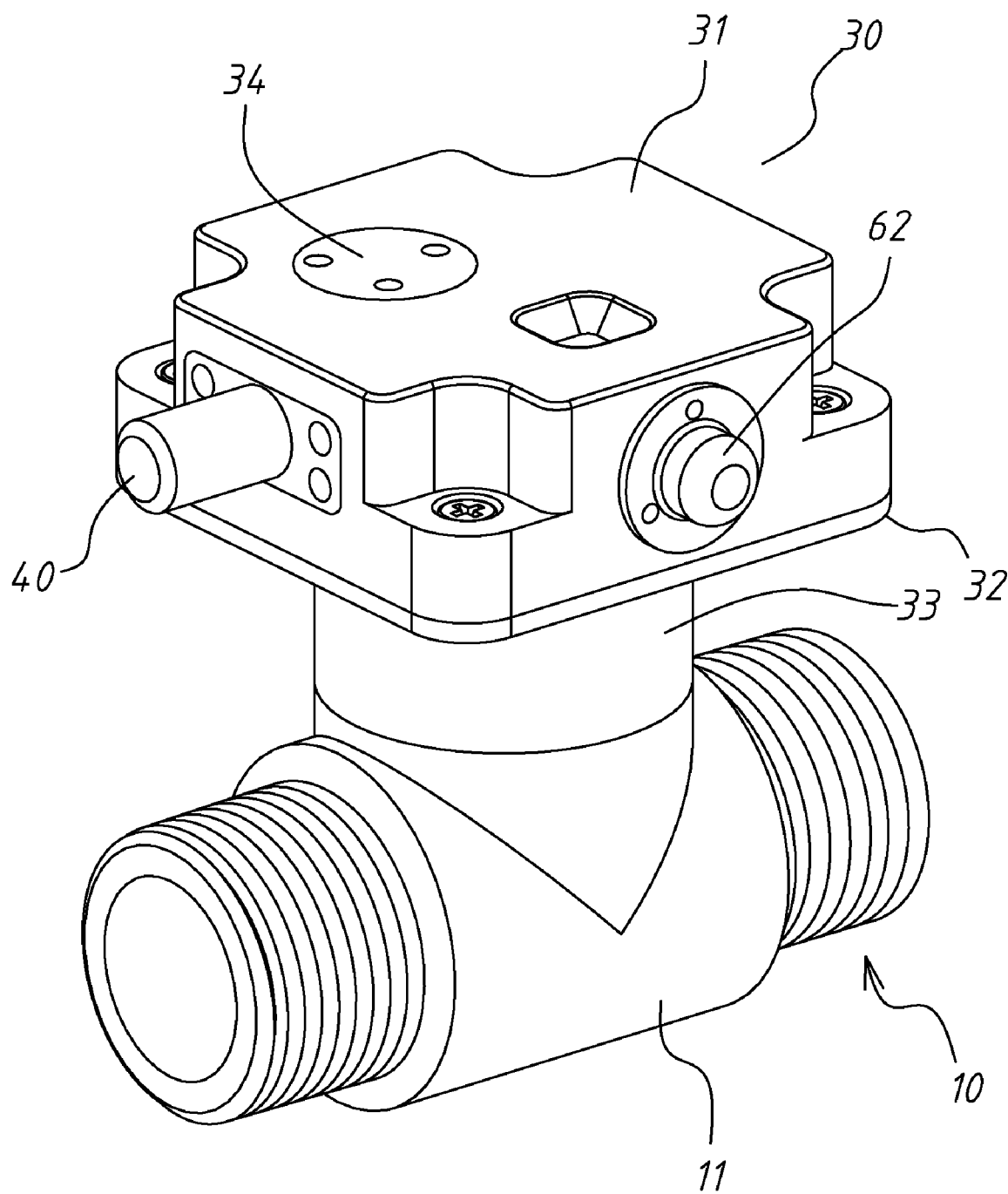
FIG. 4 is a perspective view showing of the present invention after assembling.
Figure 5:
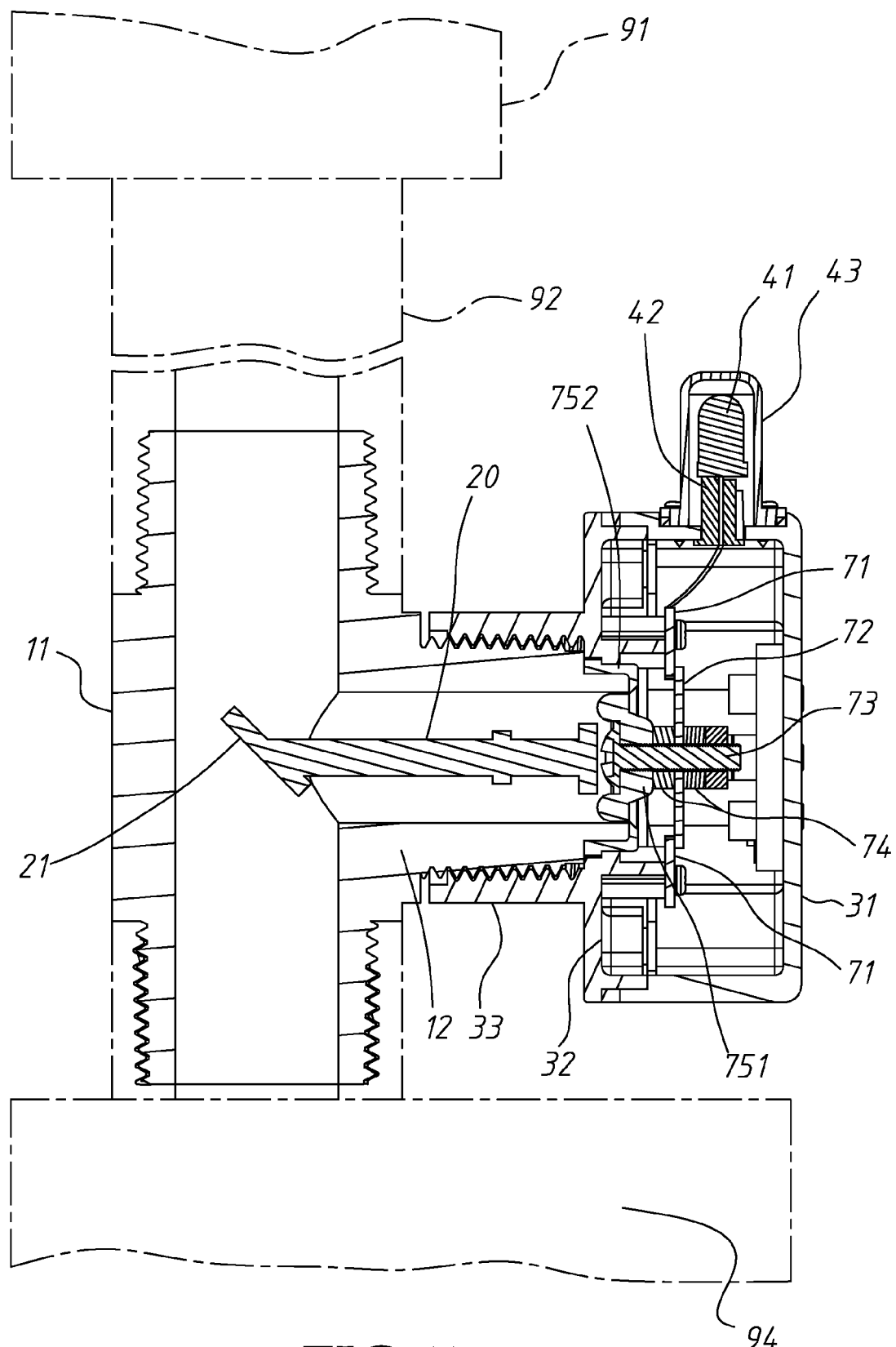
FIG. 5 is a sectional view of the present invention.
Figure 6:
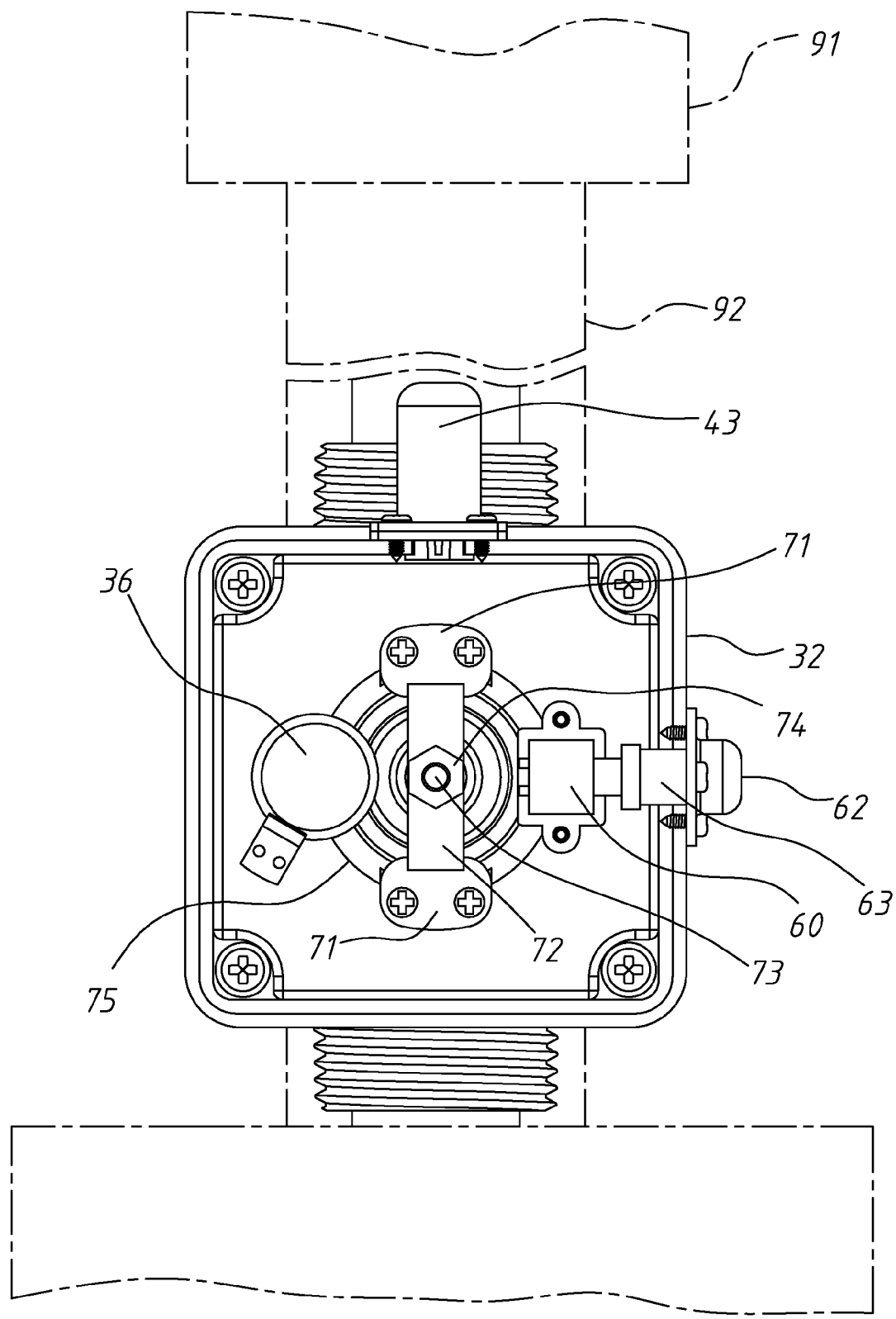
FIG. 6 is an exploded schematic view showing the internal structure of the present invention.

Referring to FIGS. 2-4 together with FIGS. 5-6, the present invention mainly is composed of a tri-branch tube 10, a pusher rod 20, a housing 30, an indicating lamp device 40, an electric power source 50, an igniting switch 60 and a triggering device 70.

The tri-branch tube 10 has a straight tube 11, two ends of it are respectively connected to the pipe line 92 of the spraying head 91, the straight tube 11 is provided in the middle of it with an intermediate tube 12. The pusher rod 20 is provided in the intermediate tube 12, a tailing end of it is extended into the straight tube 11 and is formed a bevel plate 21 intersecting in inclination to the direction of flow in order to detect the water pressure in the straight tube 11 and thus be moved. The housing 30 is composed of an upper lid 31 and a lower lid 32, a connecting tube 33 is extended out of the lower lid 32 to connect with the intermediate tube 12; the upper lid 31 and the lower lid 32 are provided therebetween with a waterproof ring 37.

The indicating lamp device 40 is provided on the housing 30 and faces upwards, and includes an LED lamp 41 being provided on a socket 42 electrically connected with the igniting switch 60; and a lamp shade 43 facing upwards and fixed on the housing 30 is used to place around and seal the LED lamp 41; a waterproof ring 44 is provided at a junction of the lamp shade 43 with the housing 30.

The electric power source 50 is provided in the housing 30 to provide electric power for the indicating lamp device 40, while the igniting switch 60 controls turning on/off; the electric power source 50 mainly is a battery 51 provided in a battery chamber 36 in the upper lid 31 of the housing 30, and the battery chamber 36 includes a battery cover 34 for opening, the battery cover 34 is provided on a top surface of the upper lid 31 for the convenience of opening for changing the battery; while the battery chamber 36 further has therein a spring sheet 52 as a positive electrode and a spring sheet 53 as a negative electrode, a battery waterproof ring 54 contacts the edge of the battery cover 34 to get an effect of water proofing. The igniting switch 60 is provided in a seat 35 in the upper lid 31, and is fixed with an opening/closing cover plate 61 locked onto the seat 35; the igniting switch 60 further has a push button 62 which is extended out of the housing 30 to make a switch sleeve 63 be moved by pressing the push button 62 to trigger the igniting switch 60 and in turn control the indicating lamp device 40 to be in an off state.

The triggering device 70 is provided in the housing 30, and can be moved by the pusher rod 20 to trigger the indicating lamp device 40. The triggering device 70 has a pair of lower electric conductive sheets 71 separately fixed in the housing 30 to separately connect the igniting switch 60; the two lower electric conductive sheets 71 are provided therebetween with a movable upper electric conductive sheet 72 which is fixed on an elastic motion member 751 of an elastic cap 75 with a bolt 73 and a nut 74, a fixing member 752 of the elastic cap 75 is fixed on the housing 30; normally, the elastic motion member 751 keeps the movable upper electric conductive sheet 72 in contact with the two lower electric conductive sheets 71, but when the pusher rod 20 pushes, the elastic motion member 751 deforms, thereby the upper electric conductive sheet 72 is separated from the two lower electric conductive sheets 71 to cut electricity.

The operation of the present invention is as below: when the filter cotton of the filter is not blocked, the pusher rod 20 detects a water pressure in the straight tube 11 and pushes the triggering device 70 to make the indicating lamp device 40 keep on its off state; however, when a filter rod of the filter is blocked, the pusher rod 20 detects that no water pressure is in the straight tube 11 and does not push the triggering device 70, thereby the indicating lamp device 40 is lightened, this indicates to users to clean or change the filter.

Figure 7:
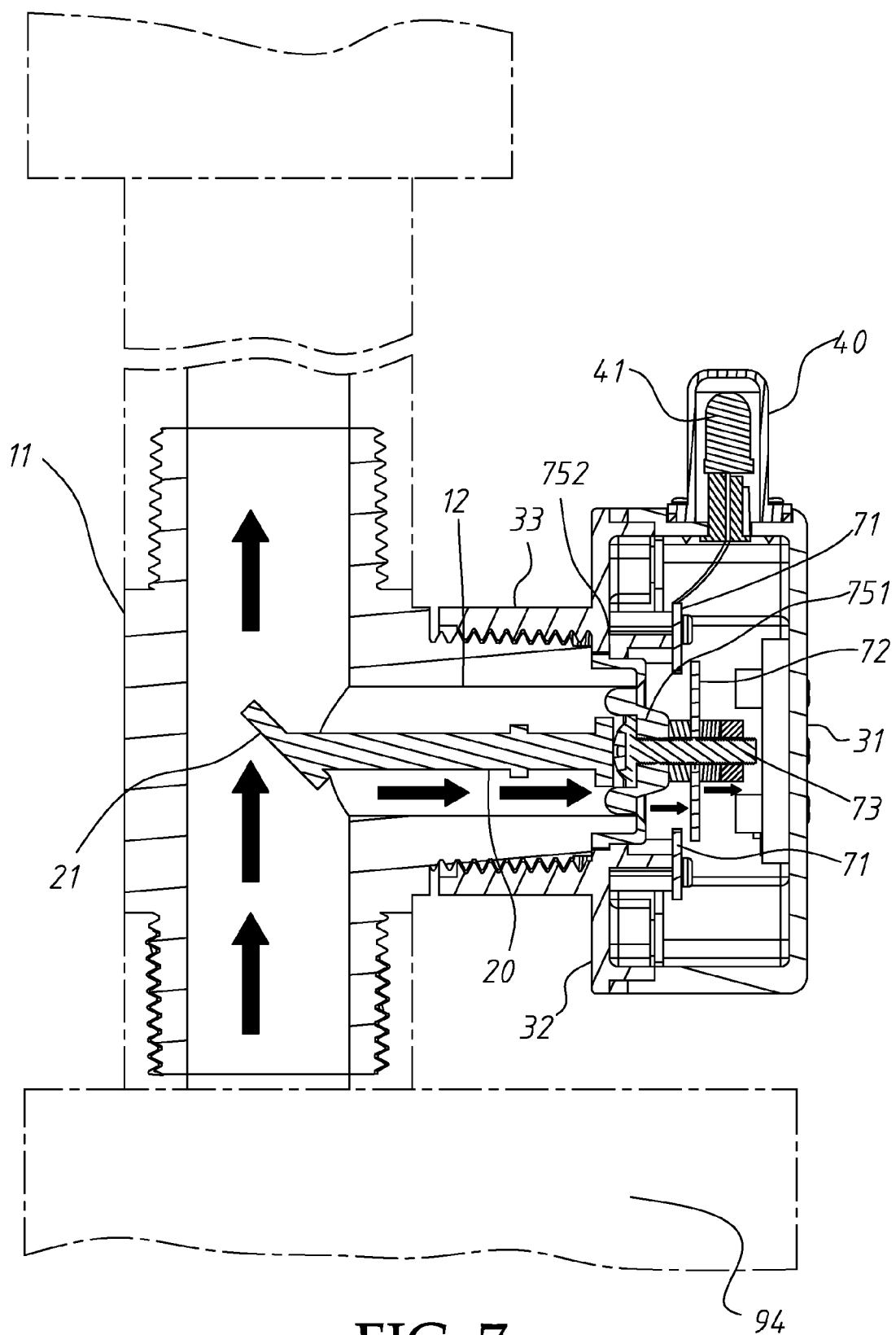
FIG. 7 is a sectional view of the present invention in a state of using.
Figure 8:
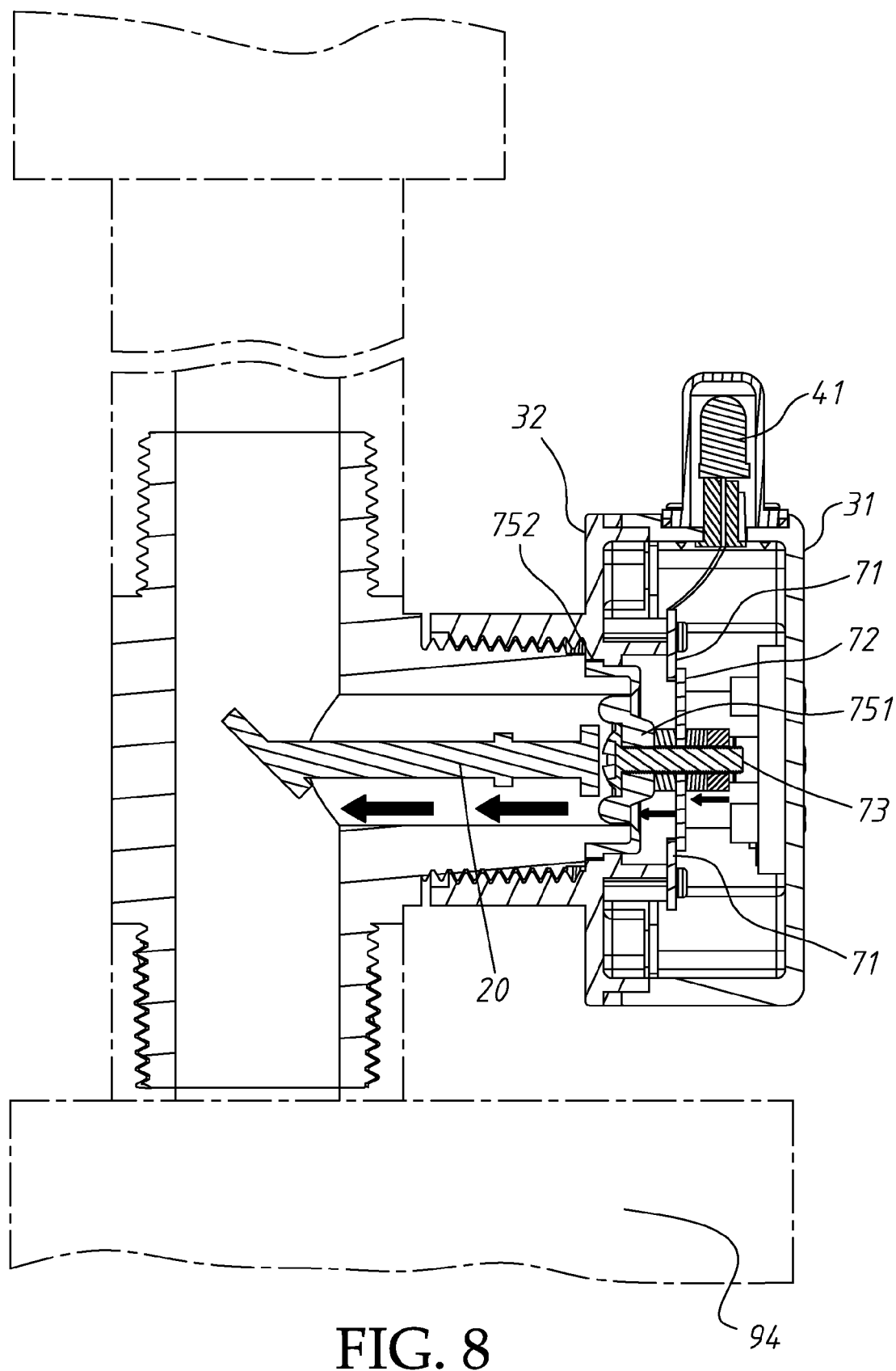
FIG. 8 is a sectional view of the present invention in a state of non-pumping.

From FIGS. 5, 7 and 8 we can see the operation of the present invention:

The indicator shown in FIG. 5 is not in the state of use, by virtue that the elastic motion member 751 of the elastic cap 75 keeps the movable upper electric conductive sheet 72 in contact with the two lower electric conductive sheets 71 normally, the igniting switch 60 can control the LED lamp 41 in the indicating lamp device 40; the push button 62 can be operated to turn off the LED lamp 41.

As shown in FIG. 7, when in the state of use (the submerged pump 94 pumps up water via the pipe line 92 and sprays water out of the spraying head 91), the push button 62 is operated to turn on the igniting switch 60, and as shown in the drawing, when water is flushed upwards after getting through the straight tube 11, it pushes the pusher rod 20 to move the bolt 73 to render the elastic motion member 751 of the elastic cap 75 to deform, thus the upper electric conductive sheet 72 is moved to separate from the two lower electric conductive sheets 71 to form open circuit, and thereby the LED lamp 41 of the indicating lamp device 40 is turned off.

Referring to FIG. 8, when the filter cotton in the filter is blocked, the submerged pump 94 is in the state of non-use, by the action of the restoring force provided by the elastic motion member 751 of the elastic cap 75, the pusher rod 20 moves toward the straight tube 11 having no water pressure, and the bolt 73 moves the upper electric conductive sheet 72 to restore the close position with the two lower electric conductive sheets 71, then the circuit is closed to lighten the LED lamp 41 of the indicating lamp device 40, so that users are aware of this, and an effect of safety is obtained.

By virtue that the two ends of the straight tube 11 on the tri-branch tube 10 of the present invention have threads, it can be screwed off the pipe line and can be mounted on a different submerged pump. And more, when the LED lamp 41 of the present invention is out of work, the lamp shade 43 can be opened for changing it, if the battery 51 of the electric power source 50 is exhausted, the battery cover 34 can be opened for changing it. In view of the above stated, the present invention is really convenient in use.

In conclusion, present invention is patentable in the light of the above teachings; the embodiment given and depicted is only for illustrating a preferred embodiment of the present invention. It will be apparent to those skilled in this art that various modifications or changes without departing from the spirit of this invention shall also fall within the scope of the appended claims.

The invention claimed is:

1. A flow indicator for showing blocking of filter cotton being used on a pipe line for a spraying head for showing blocking of said filter cotton in a filter in connecting with a submerged pump for said spraying head, said flow indicator comprises:
    a tri-branch tube, having a straight tube of which two ends are respectively connected to said pipe line of said spraying head, said straight tube is provided in its middle with an intermediate tube;
    a pusher rod provided in said intermediate tube, a tailing end thereof is extended into said straight tube and is formed as a bevel plate facing in inclination to impact with the flow of water in order to detect water pressure in said straight tube and thus be moved;
    a housing composed of an upper lid and a lower lid, a connecting tube is extended out of said lower lid to connect with said intermediate tube;
    a indicating lamp device provided on said housing and facing upwards;
    an electric power source provided in said housing to provide electric power for said indicating lamp device, while an igniting switch is provided to control turning on/off said indicating lamp device; and
    a triggering device provided in said housing, and moved by said pusher rod to trigger and move said indicating lamp device;
    wherein when said filter cotton of said filter is not blocked, said pusher rod detects a water pressure in said straight tube and pushes said triggering device to make said indicating lamp device keep in its off state; however, when a filter cotton of said filter is blocked, said pusher rod detects that no water pressure is in said straight tube and does not push said triggering device, thereby said indicating lamp device is lightened.

2. The flow indicator for showing blocking of filter cotton as claimed in claim 1, wherein said triggering device has a pair of lower electric conductive sheets separately fixed in said the housing to separately connect said igniting switch; said two lower electric conductive sheets are provided therebetween with a movable upper electric conductive sheet which is fixed on an elastic motion member of an elastic cap with a bolt and a nut, a fixing member of said elastic cap is fixed on said housing; normally, said elastic motion member keeps said movable upper electric conductive sheet in contact with said two lower electric conductive sheets, but when said pusher rod pushes, said elastic motion member deforms, thereby said upper electric conductive sheet is separated from said two lower electric conductive sheets to cut electricity.

3. The flow indicator for showing blocking of filter cotton as claimed in claim 1, wherein said igniting switch further has a push button extended out of said housing, thus to control said indicating lamp device to be in an off state.

4. The flow indicator for showing blocking of filter cotton as claimed in claim 1, wherein said igniting switch is provided in a seat in said upper lid of said housing, and is fixed with an opening/closing cover plate locked onto said seat.

5. The flow indicator for showing blocking of filter cotton as claimed in claim 1, wherein said indicating lamp device includes an LED lamp being provided on a socket electrically connected with said igniting switch; and a lamp shade facing upwards and fixed on said housing is used to place around and seal said LED lamp.

6. The flow indicator for showing blocking of filter cotton as claimed in claim 5, wherein a waterproof ring is provided at a junction of said lamp shade with said housing.

7. The flow indicator for showing blocking of filter cotton as claimed in claim 1, wherein said electric power source is a battery provided in a battery chamber in said upper lid of said housing, and said battery chamber includes a battery cover for opening, said battery cover is provided on a top surface of said upper lid.

\* \* \* \* \*